(12) United States Patent
Ma

(10) Patent No.: US 9,751,697 B2
(45) Date of Patent: Sep. 5, 2017

(54) SPLIT SPROCKET HAVING A SNAP CLAMP

(71) Applicant: Laitram, L.L.C., Harahan, LA (US)

(72) Inventor: Ruizhe Ma, Grand Rapids, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/133,373

(22) Filed: Apr. 20, 2016

(65) Prior Publication Data
US 2016/0312874 A1 Oct. 27, 2016

Related U.S. Application Data

(60) Provisional application No. 62/151,541, filed on Apr. 23, 2015.

(51) Int. Cl.
*F16H 55/12* (2006.01)
*B65G 23/06* (2006.01)

(52) U.S. Cl.
CPC .................................. *B65G 23/06* (2013.01)

(58) Field of Classification Search
CPC ................................ B65G 23/06; F16H 55/12
USPC .................................... 474/95; 198/834, 835
See application file for complete search history.

(56) References Cited

U.S. PATENT DOCUMENTS

| 1,223,024 A | 4/1917 | Barry |
| 1,391,719 A | 9/1921 | Conyngham |
| 2,451,690 A | 10/1948 | Oehler |
| 2,465,570 A | 3/1949 | Bocchino |
| 3,097,541 A | 7/1963 | Kindig |
| 4,506,559 A * | 3/1985 | Francke .................. F16H 55/12 29/892.1 |
| 4,964,842 A | 10/1990 | Howard |
| 5,037,356 A | 8/1991 | Gladczak et al. |
| 5,295,917 A | 3/1994 | Hannum |
| 5,316,522 A | 5/1994 | Carbone et al. |
| 5,322,478 A | 6/1994 | Bos et al. |
| 5,389,044 A * | 2/1995 | Bandy, Jr. .............. B65G 23/06 474/152 |
| 5,469,958 A | 11/1995 | Gruettner et al. |
| 5,511,893 A | 4/1996 | Kilgus et al. |
| 5,806,658 A * | 9/1998 | Hannum .............. B01D 21/183 198/731 |
| 5,810,686 A | 9/1998 | de Jong et al. |
| 5,848,947 A | 12/1998 | Fornasiere et al. |

(Continued)

FOREIGN PATENT DOCUMENTS

WO 0047916 A1 8/2000

OTHER PUBLICATIONS

International Search Report and Written Opinion of the International Searching Authority, PCT/US2016/028333, dated Jul. 20, 2016, Korean Intellectual Property Office, Daejeon, Republic of Korea.

*Primary Examiner* — Douglas Hess
(74) *Attorney, Agent, or Firm* — Catherine M. Bishop

(57) ABSTRACT

A split sprocket for belts or chains comprising a first section and a second section that mates with the first section to form a sprocket with drive teeth distributed about the periphery and a central hub for retaining a shaft. The first section includes a snap clamp having a barbed tip for mounting the first section to a shaft. The second section includes mating elements complementary to mating elements in the first section to allow the second section to mate with the first section to form a complete sprocket.

17 Claims, 11 Drawing Sheets

(56) References Cited

U.S. PATENT DOCUMENTS

| | | | |
|---|---|---|---|
| 6,074,316 | A | 6/2000 | Murrietta, Sr. |
| 6,086,495 | A | 7/2000 | Stebnicki et al. |
| 6,146,299 | A | 11/2000 | Harvey |
| 6,279,752 | B1 * | 8/2001 | Hannum ................ B01D 21/04 198/728 |
| 6,543,609 | B2 | 4/2003 | Layne et al. |
| 6,758,776 | B2 | 7/2004 | Fye et al. |
| 8,267,818 | B2 | 9/2012 | Curley et al. |
| 9,097,332 | B2 * | 8/2015 | Li .......................... F16H 55/12 |
| 9,527,672 | B2 * | 12/2016 | Batchelder ............. B65G 21/06 |
| 2014/0144754 | A1 | 5/2014 | Miller et al. |
| 2014/0305241 | A1 | 10/2014 | Li et al. |

* cited by examiner

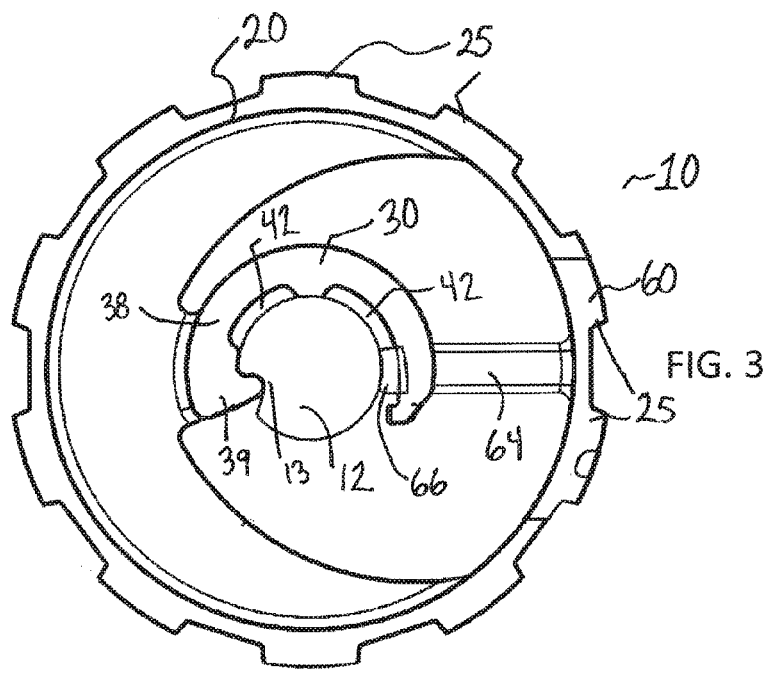
FIG. 3
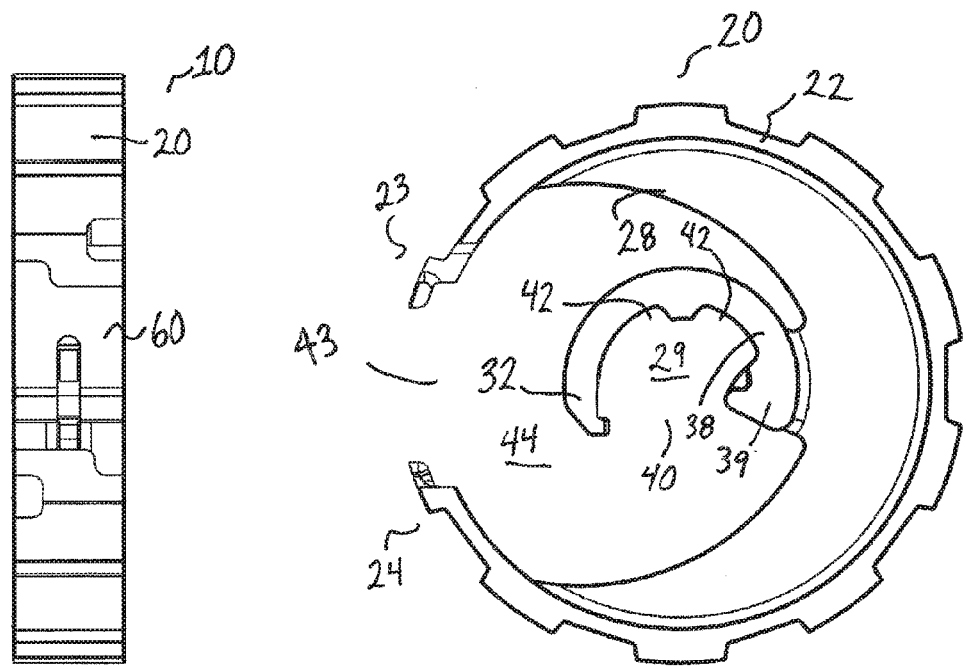
FIG. 4
FIG. 5 ly to U.S. Provisional
SPLIT SPROCKET HAVING A SNAP CLAMP

RELATED APPLICATION

The present application claims priority to U.S. Provisional Patent Application No. 62/151,541, filed Apr. 23, 2015 and entitled "Split Sprocket Having a Snap Clap" the contents of which are herein incorporated by reference.

BACKGROUND

The invention relates generally to split sprockets that can be assembled on a drive shaft in an endless conveyor belt system.

Sprockets are used to drive endless power-transmission and conveyor belts and chains. Each sprocket is mounted on a shaft received by a bore extending axially through the sprocket. The shaft is supported at both ends by bearing blocks. A gearbox or a belt-driven pulley mounted to an end of the shaft makes the shaft a driveshaft. Installing a one-piece sprocket on a driveshaft requires that at least one bearing block be removed to slide the sprocket axially onto the shaft. Typically, the shaft also has to be lifted out of the conveyor side frame.

Split sprockets that are split along seams through their bores can be installed on shafts without removing bearing blocks. A first piece of the split sprocket is positioned on the shaft. Then, a complementary second piece is mated to the first piece. The two pieces are fastened to each other, usually by a pair of bolts or screws. One version of a split sprocket used with conveyor belts has two identical halves that fit together with mating puzzle-piece structure. Screws through the puzzle-piece structure at both seams tighten the pieces together. But the two screws do not provide much resistance to axial shifting of one sprocket half relative to the other. In addition, the need for tools to assemble the sprockets complicates assembly and disassembly and also presents potential cleanliness issues, potentially inhibiting hygiene.

SUMMARY

One version of a split sprocket embodying features of the invention comprises first and second sprocket sections that mate to form a sprocket with drive teeth distributed about the periphery thereof. A central hub in the sprocket retains a shaft. The first section includes a snap clamp having a barbed tip for mounting the first section to a shaft. The second section includes mating elements complementary to mating elements in the first section to allow the second section to mate with the first section to form a complete sprocket. The second section may include a stem extending inwards from a peripheral portion and a head at the end of the stem extending within the central hub for retaining the shaft within the hub. The second section may be axially symmetric or asymmetric. The first section may comprise a curved peripheral portion having an opening that is offset from an opening in the hub for receiving the shaft.

According to one aspect, a sprocket for a conveyor belt comprises a first sprocket section having a curved peripheral portion defining driving elements and a snap clamp radially inward of the peripheral portion for snapping the first sprocket section onto a shaft.

According to another aspect, a split sprocket comprises a first sprocket section having a curved peripheral portion defining drive elements and forming a peripheral opening between a first end and a second end, a hub defining a central opening for receiving a shaft and a cap having a peripheral portion inserted in the peripheral opening of the first sprocket section. The cap has a stem extending inwards from the peripheral portion and a head at the end of the stem extending within the hub for retaining the shaft within the hub.

According to another aspect, a split sprocket comprises a first sprocket section having a curved peripheral portion defining drive elements and forming a peripheral opening between a first end and a second end, a hub defining a central opening for receiving a shaft and a cap having an axially symmetric peripheral portion inserted in the peripheral opening of the first sprocket section to form a complete sprocket.

BRIEF DESCRIPTION OF THE DRAWINGS

FIG. 3 shows the assembled split sprocket of FIG. 1 mounted to a shaft;

FIG. 4 is a side view of the assembled split sprocket of FIG. 1;

FIG. 5 is a rear view of the base portion of the split sprocket of FIG. 1;

DETAILED DESCRIPTION

Figure 1:
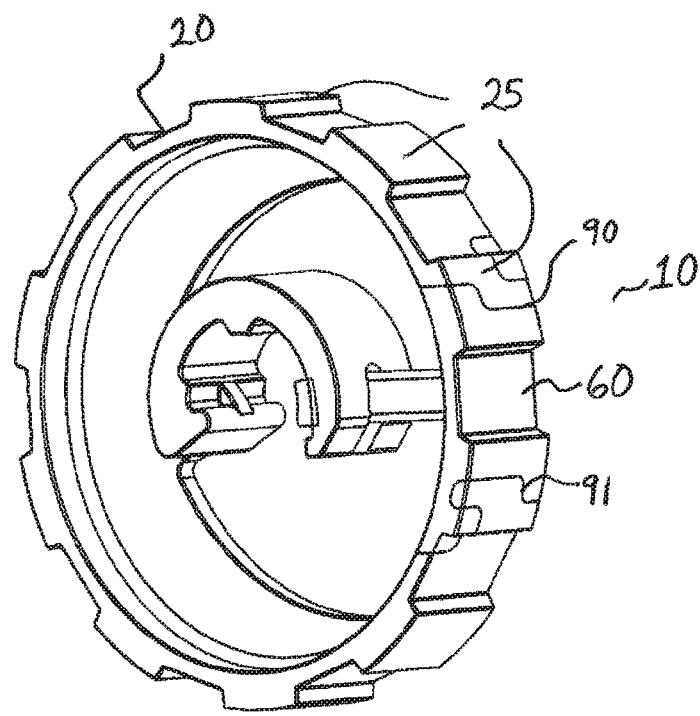
FIG. 1 is an isometric view of an assembled split sprocket according to an embodiment of the invention.
Figure 2:
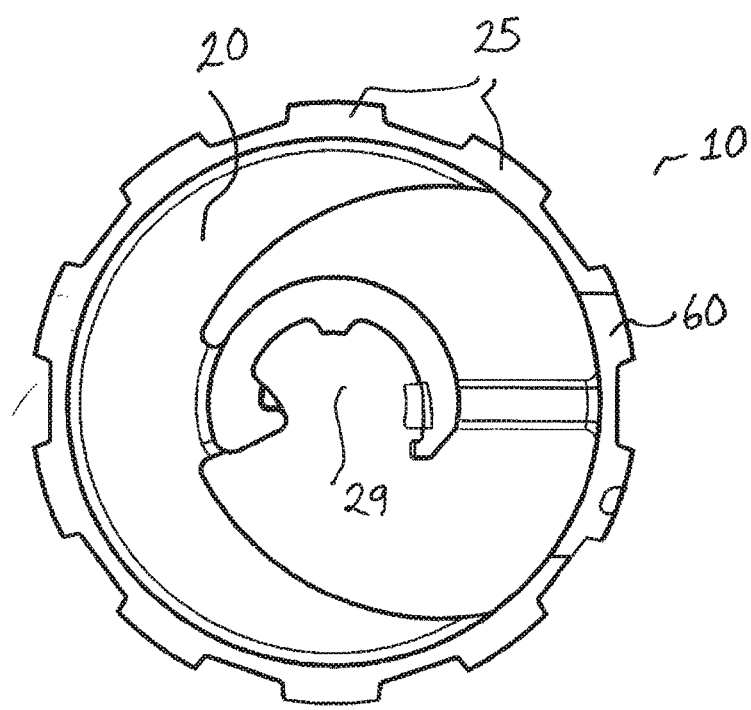
FIG. 2 is a front view of the assembled split sprocket of FIG. 1.

A split sprocket for driving or otherwise engaging a conveyor belt comprises multiple portions that mate together about a rotatable shaft. Embodiments of the invention employ a snap clamp having an anchor, such as a protrusion that engages a channel in the rotatable shaft. A body of the snap clamp mates with the body of the shaft. Optionally, an axial tab engages a notch or other seat in the shaft. The split sprocket may be installed on, retained on and removed from the shaft without the use of tools, or with minimal use of tools. The invention will be described below relative to certain illustrative embodiments, though the invention is not limited to the illustrative embodiments.

One version of a split sprocket embodying features of the invention is shown in FIGS. 1-4. The illustrative split sprocket 10 comprises two sections: a first section, shown as a base portion 20, and a second section, shown as a cap portion 60. The cap portion 60 mates with the base portion 20 to form a sprocket having peripheral drive elements, shown as teeth 25, for engaging drive structure on a conveyor chain or belt. The illustrative teeth are spaced equally around the circumference of the periphery at a constant pitch. However, the invention is not limited to the illustrative drive element configuration, and the drive structure may have any suitable size, shape, pitch and configuration suitable for engaging a conveyor belt or chain. In the illustrative embodiment, the base portion and the cap portion are joined together in a puzzle pattern to form the complete sprocket, though any suitable connection means may be used to join together the two sections.

Each section 20, 60 may comprise a single unitary piece or multiple subpieces coupled together. In this example, the two sections are shaped differently, with the first section 20 being the larger section. The illustrative base portion 20 is curved and spans the majority of the circumference of the sprocket except for a space 43 in the periphery, with the cap portion 60 inserted in the space 43 and completing the circumference when mated to the base portion 60.

The sprocket 10 includes a collar or central hub 30 defining a central opening 29 for receiving a shaft 12, as shown in FIG. 3. In the illustrative embodiment, the hub 30 forms a snap clamp for engaging the shaft 12 by a snap fit connection. An example of a suitable snap clamp is described in U.S. patent application Ser. No. 14/602,741 filed Jan. 22, 2015 entitled "Cleanable Conveyor Frame Assembly Including Snap-On Components" and U.S. patent application Ser. No. 14/602,455 filed Jan. 22, 2015 and entitled "Snap-On Position Limiter for a Conveyor Belt", now U.S. Pat. No. 9,296,565, the contents of both applications being herein incorporated by reference.

Figure 6:
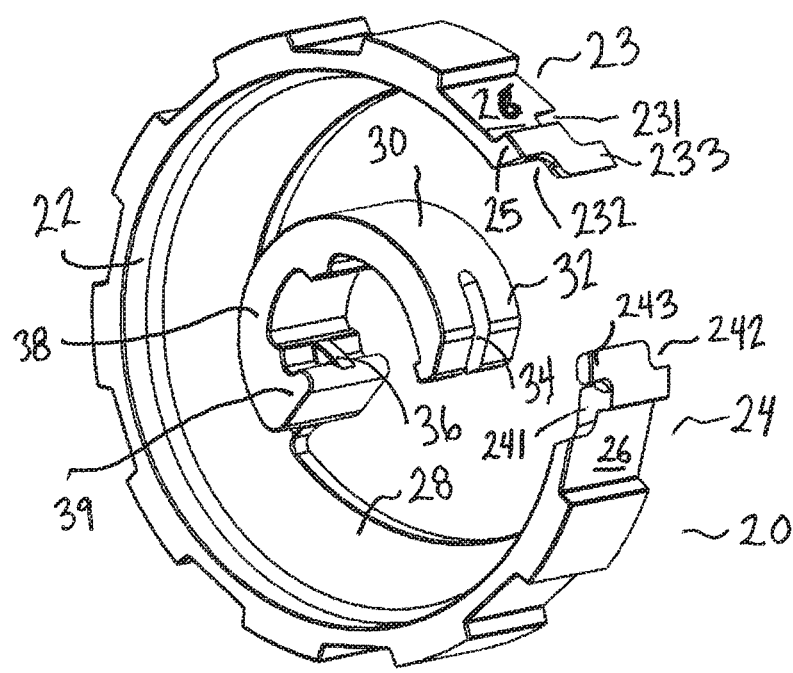
FIG. 6 is an isometric view of the base portion of FIG. 5.
Figure 7:
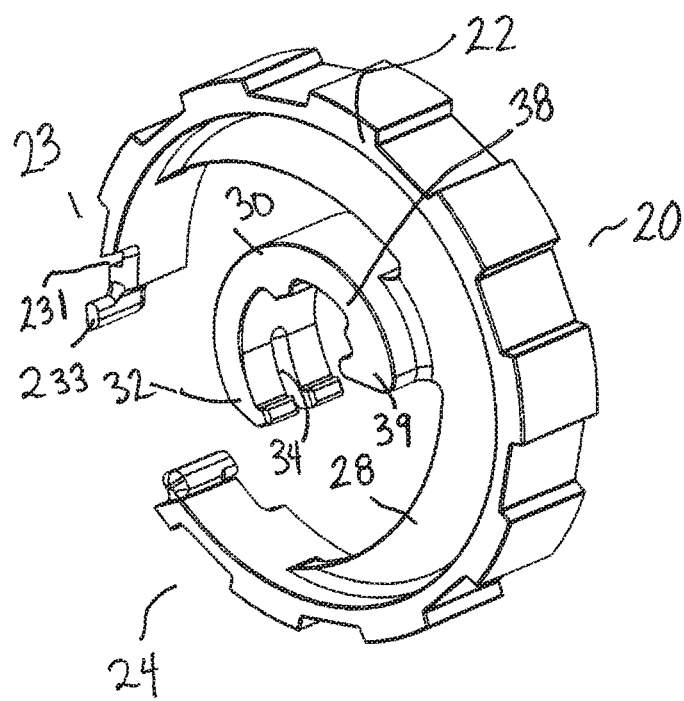
FIG. 7 is another view of the base portion of FIG. 5.
Figures 8, 9:
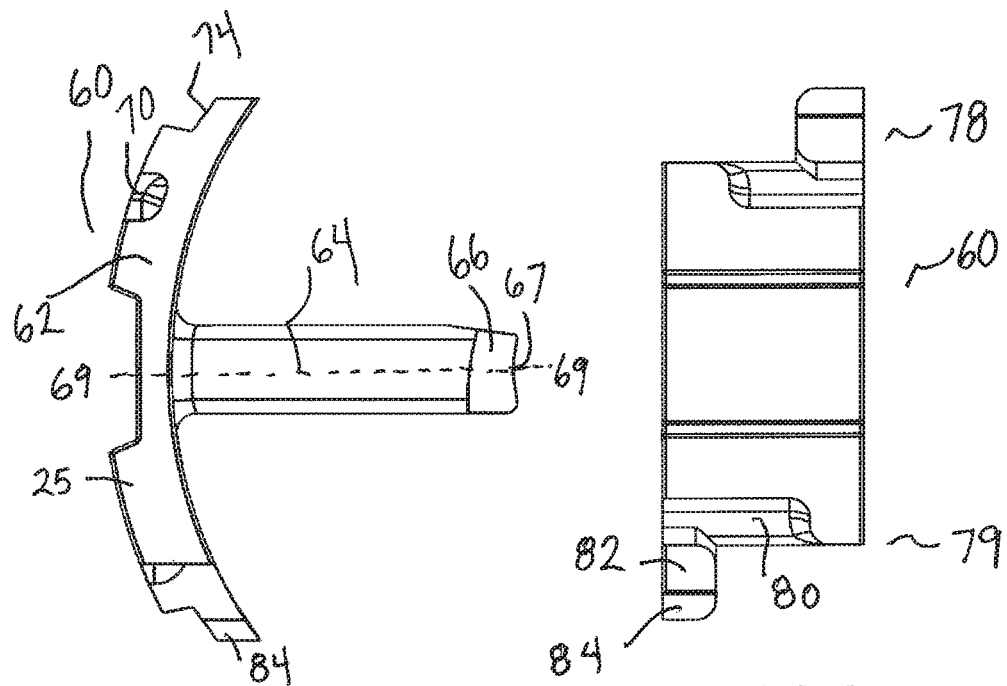
FIG. 8 is a front view of the cap portion of the split sprocket of FIG. 1.
FIG. 9 is a side view of the cap portion of the split sprocket of FIG. 1.
Figures 10, 11:
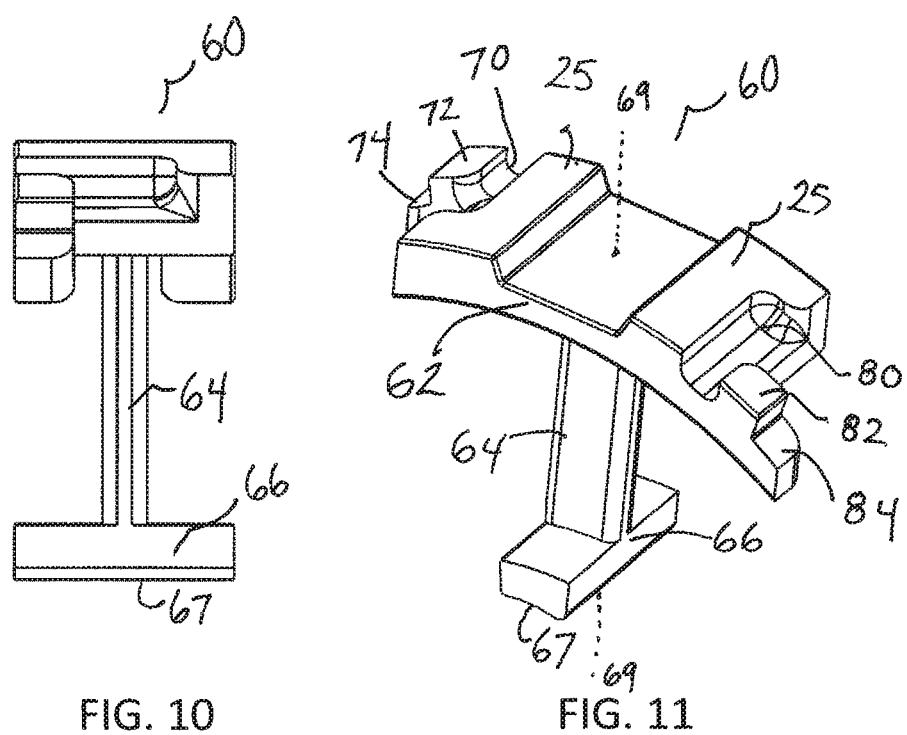
FIG. 10 is a top view of the cap portion of the split sprocket of FIG. 1.
FIG. 11 is an isometric view of the cap portion of the split sprocket of FIG. 1.

Referring to FIGS. 5-7, which show the base portion 20 alone, in the illustrative embodiment, the snap clamp 30 is formed within the base portion 20 and connected to a curved peripheral portion 22 of the base portion 20 by a web 28, though any suitable means for connecting the central hub 30 to the peripheral portion 22 may be used. The illustrative snap clamp comprises a central hub forming a first leg 32 and a second leg 38. The illustrative hub is semi-annular and designed to engage a shaft 12, which is inserted into the central opening 29 via a space 40 between the legs 32, 38. The resting shape of the hub 30 can be different from the shaft 12 and is flexible enough to allow stretching or compression to snap the snap clamp into place on the shaft 12. In the illustrative embodiment, the hub 30 is larger than the shaft 12 to allow some initial movement of the shaft 12, which is then held firmly in place by a head on the cap portion 60 when the sprocket is fully assembled, as described below.

The first leg 32 terminates in a flat end surface while the second leg 38 terminates in a barbed tip 39 for anchoring the snap clamp. The protrusion on the barbed tip 39 engages a channel 13 or other feature on a shaft, as shown in FIG. 3, to anchor the snap clamp to the shaft. An axial tab 36 extends between the radially inner surface of the clamp and the barbed tip 39. The tab 36 matches and engages a recess on a corresponding shaft 12 to prevent axial movement of the sprocket on the shaft 12.

The stiffness and tension of the snap clamp 30 may be varied depending on the material used, thickness of the legs, degree of wrap of the gripping element and other factors that may be varied.

The hub 30 further includes cleaning recesses 42 on an inner surface thereof for allowing space between the shaft 12 and hub 30 to promote cleanliness and facilitate cleaning.

The first leg 32 further includes a slot 34 for receiving a component of the cap portion 60. The illustrative slot 34 extends up from the tip of the first leg 32, through the thickness of the hub 30 and is perpendicular to the longitudinal axis of the opening 29 and shaft 12. The slot 34 receives a stem 64 of the cap portion 60 for seating a head 66 of the cap portion against the shaft 12 when the sprocket 10 is assembled, as shown in FIG. 3. In one embodiment, the first leg 32 is hooked to contain the downward movement of the cap head 66, though the invention is not so limited.

Referring to FIG. 5, the space 40 between the snap clamp legs 32 and 38 is offset from the space 43 in the periphery of the base portion 20 that receives the cap portion 60. To mount the base portion 20 to a shaft, the shaft 12 first passes through the peripheral space 43, then through space 44 between the first leg 32 and peripheral portion 22 before passing through snap clamp space 40 and being snapped into the central opening 29 of the hub 30.

The base portion 20 further includes a retaining mechanism for mating with the cap portion. In the illustrative embodiment, the retaining mechanism includes cutouts and projections to match complementary features in the cap portion 60. The illustrative first leg 23 of the peripheral portion 22 terminates mid-tooth and includes a first opening 231 in a first side edge of the peripheral portion 22. The first opening extends through the peripheral portion 22 and extends from the tooth recess 22 to the tooth 25. The first leg 23 further includes an indentation 232 in the opposite side edge of the peripheral portion at the end of the first leg 23 (entirely within the tooth 25). The openings 231, 232 form a protrusion 233 at the end of the first leg 23. The openings 231 and 232, when mated with the cap portion 60, prevent the relative movement between the cap portion 60 and the base portion in both axial directions of the shaft. Alternative mating patterns may be used. The illustrative second leg 24 of the peripheral portion 22 includes a first opening 241 in the second side edge of the peripheral portion that extends through the peripheral portion 22 and through both a tooth recess 26 and tooth 25. An indentation 242 is formed in the end of the second leg 24 on the first side edge, forming a protrusion 243 at the end of the second leg 24.

The cap portion is designed to mate with the base portion to form a complete sprocket. Referring to FIGS. 8-11, the illustrative cap portion 60 includes a curved peripheral portion 62 including portions of drive elements to match and complete portions of drive elements, shown as teeth 25, on the ends of base portion. The cap portion 60 further includes a stem 64 extending radially inwards from the peripheral portion 62 and terminating in a head 66. The inner surface 67 of the head 66 may be slightly curved to match the curve of the shaft 12.

The ends of the cap peripheral portion 62 are complementary to the ends 23, 24 of the base portion peripheral portion. A first end 78 of the peripheral portion 62 includes a channel 70 in the outer surface of the tooth 25. The channel 70 forms a projection 72 on the first side edge of the cap portion 60. A lip 74 extends beyond the projection 72 along the first side edge of the cap portion, while the second side edge has a space across from the projection and 72 and lip 74.

The second end 79 of the peripheral portion is complementary to the end 24 of the base portion. The second end 79 includes a channel 80 similar to the first end channel 70, a projection 82 similar to the first end projection 72 and a lip 84 similar to the first end lip 84.

In one embodiment, the cap ends may be asymmetrical to prevent installation of the cap in the wrong orientation. Alternatively, the second end 79 may be rotationally symmetric with the first end 78. For example, the cap portion 60 may rotationally symmetric about a longitudinal axis 69 of the stem 64, with a rotational symmetry on the order of two, so that the cap portion 60 can be reversible about the axis 69. In this manner, the cap portion 60 would be able to be rotated 180° and still have the same configuration. However, the cap portion may alternatively be asymmetric.

Figure 12A:
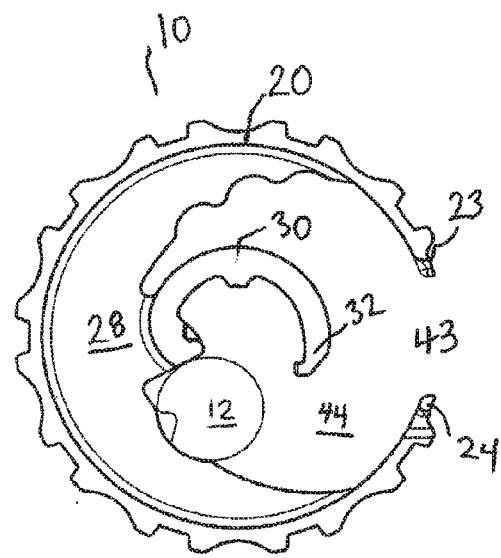
FIGS. 12A-12C illustrate a process of mounting and assembling the split sprocket according to an embodiment of the invention.
Figure 12B:
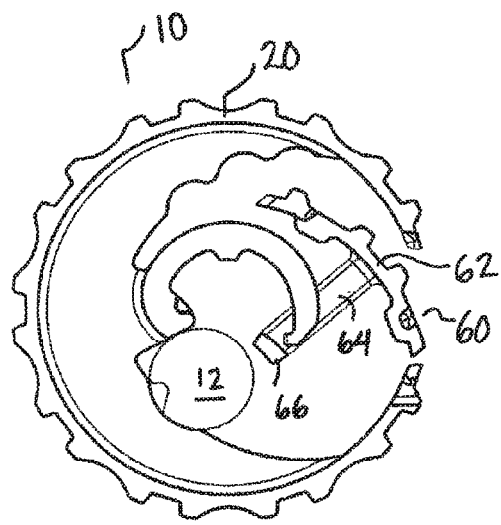
Figure 12C:
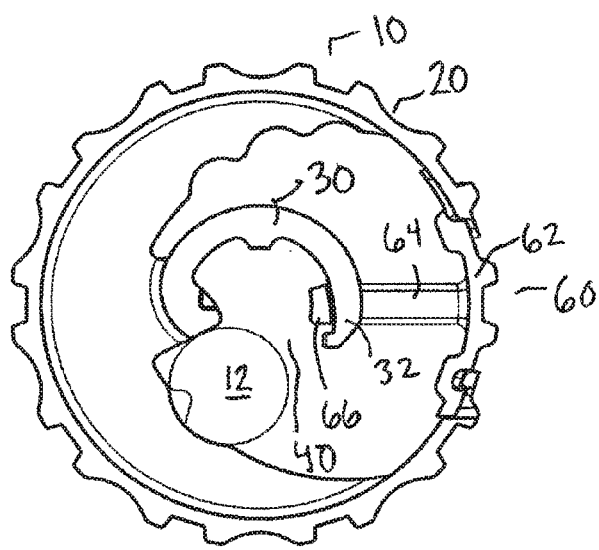

FIGS. 12A-12C show one method of mounting the split sprocket 10 to a shaft 12. First, the shaft 12 is first inserted through opening 43 in the base portion 20 between ends 23 and 24. Then, the shaft 12 passes through space 44 and into a corner formed by the web 28 and snap clamp 30, leaving space between the second leg 32 of the hub 30 and the shaft 12, as shown in FIG. 12A. Then, as shown in FIG. 12B, the head 66 of a cap portion 60 passes through the space between the shaft 12 and second leg 32 and into space 29, with the cap stem 64 passing through the hub slot 34. Then, as shown in FIG. 12C, the peripheral portion 62 of the cap portion is pulled into alignment with the peripheral portion 22 of the base portion, so that the cap head 66 slides up the slot 34 and is pulled back against the inner surface of the second leg 32. The complementary mating features of the peripheral portion 20 and cap portion 60 engage each other. The shaft 12 snaps into place by passing through the opening 40 and into place within the opening 29. When snapped in place, the inner surface 69 of the head contacts the shaft outer surface 12. The shaft 12 pushes against the cap head 66 to help maintain proper engagement of the cap portion 60 with the base portion 10, as shown in FIG. 3.

The snap clamp 30 is anchored to the shaft 12 by inserting the barbed tip 39 into a channel 13 of the shaft. Optionally, the axial tab 36 is inserted in a corresponding recess of the shaft 12. Other suitable means for anchoring and maintaining axial alignment of the sprocket relative to the shaft 12 may be used.

In the illustrative embodiment, the cap protrusion 72 and 74 mates with the base opening 231, with the protrusion 233 at the end of the first leg 23 mating with the channel 70. Similarly, the cap protrusion 82 and 84 fits in the base opening 241, with the protrusion 243 engaging the channel 80. The assembled sprocket presses the head 66 against the shaft 12 to secure the shaft 12 in the opening 29. In this manner, a complete sprocket is mounted on a shaft without requiring tools.

Alternatively, the head 66 may be inserted through the slot 34 after passing the shaft 12 into the hub 30, or may be inserted in the slot before passing the shaft 12 through the opening 43 formed in the periphery of the base portion.

As shown in FIG. 1, the illustrative sprocket 10 has seams 90, 91 formed in adjacent teeth 25, i.e., the cap portion 60 spans about one belt pitch, with a first end mid-tooth and a second end mid-tooth and a full recess in between, though the invention is not so limited, and the cap portion 60 can span any suitable number of teeth.

Figure 13:
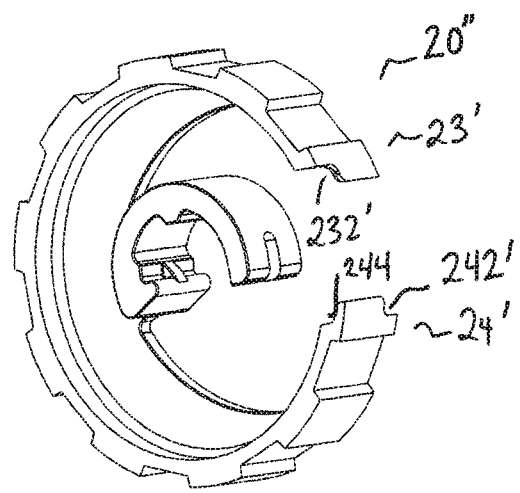
FIG. 13 shows a base portion of a split sprocket according to another embodiment of the invention.
Figure 14:
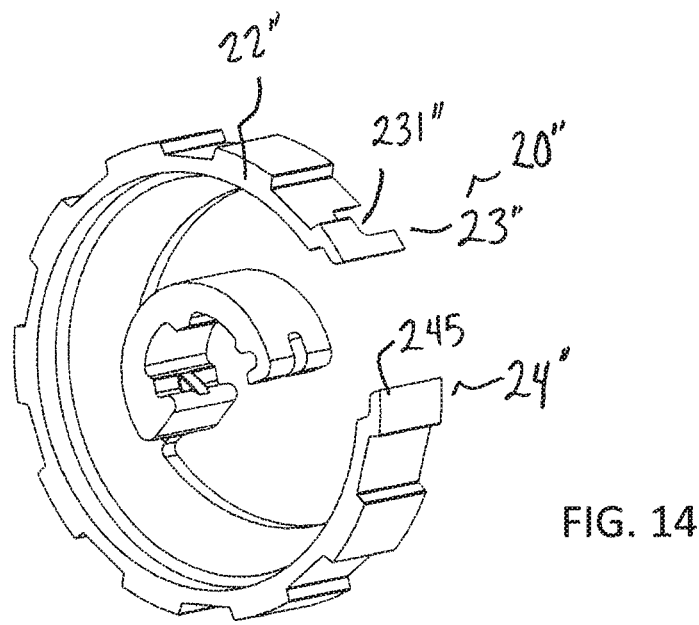
FIG. 14 shows a base portion of a split sprocket according to another embodiment of the invention.
Figure 15A:
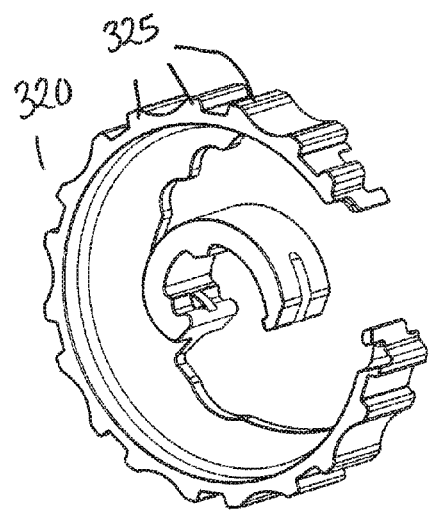
FIGS. 15A-15E show a base portion of a split sprocket according to another embodiment of the invention.
Figure 15B:
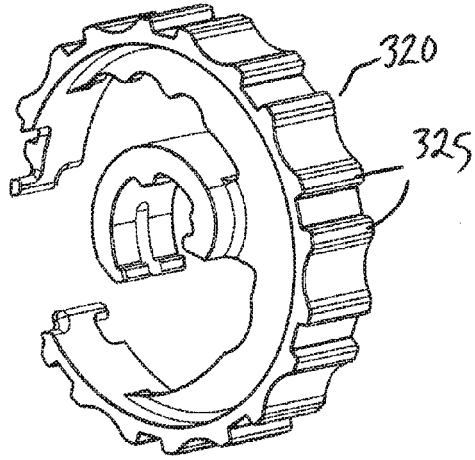
Figure 15C:
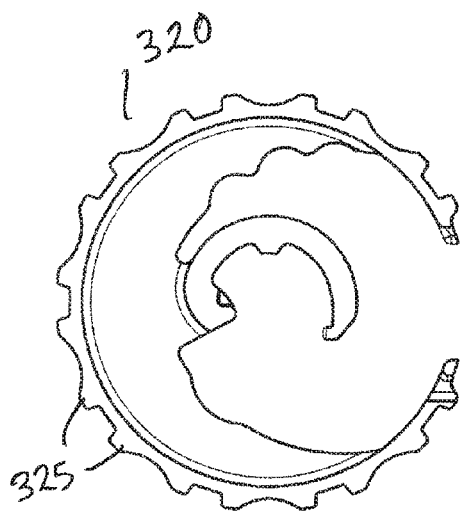
Figure 15D:
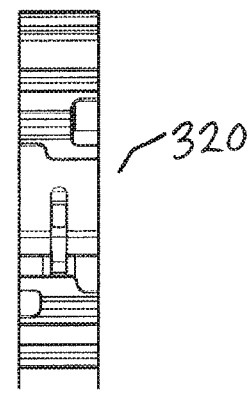
Figure 15E:
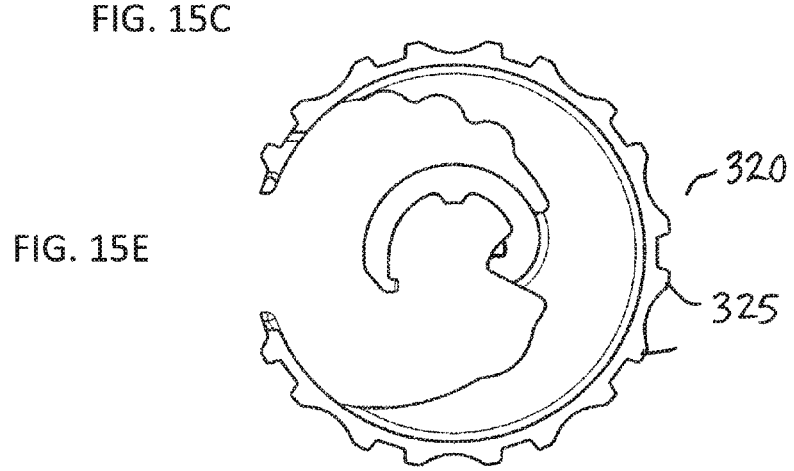
Figure 16A:
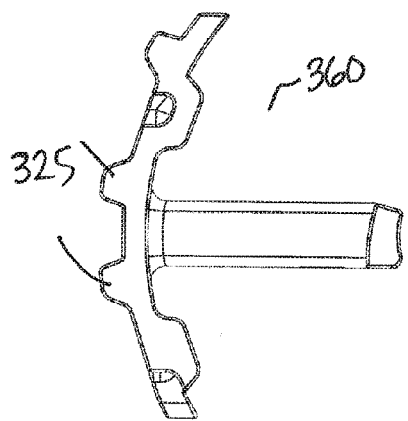
FIGS. 16A-16D show a cap portion suitable for mating with the base portion of FIGS. 15A-15E.
Figure 16B:
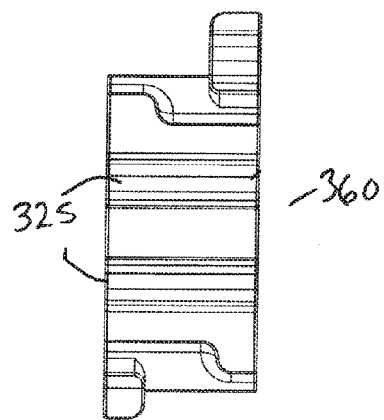
Figure 16C:
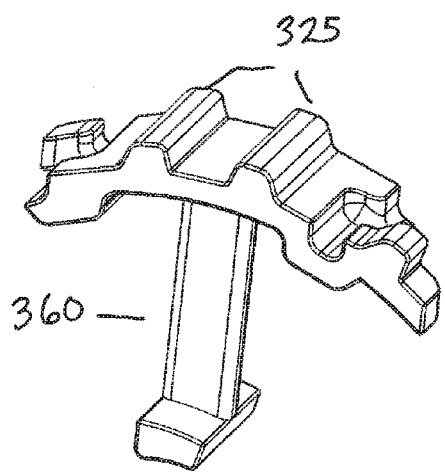
Figure 16D:
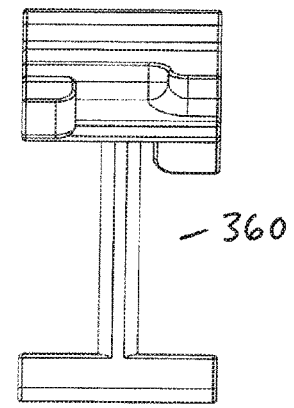

Referring to FIGS. 13 and 14, the invention is not limited to the mating pattern between the base portion and cap portion shown in FIGS. 1-12C. For example, as shown in FIG. 13, a base portion 20' may include only indentation 232' on a first end 23' and a lip 244 and indentation 242' on a second end 24' to mate with complementary features on a cap portion. In another embodiment, shown in FIG. 14, a base portion 60" may include only an opening 231' in a first side edge of the peripheral portion 22' on a first end 23" and a lip projection 245 on a second end 24" to mate with complementary features on a cap portion.

Figure 17A:
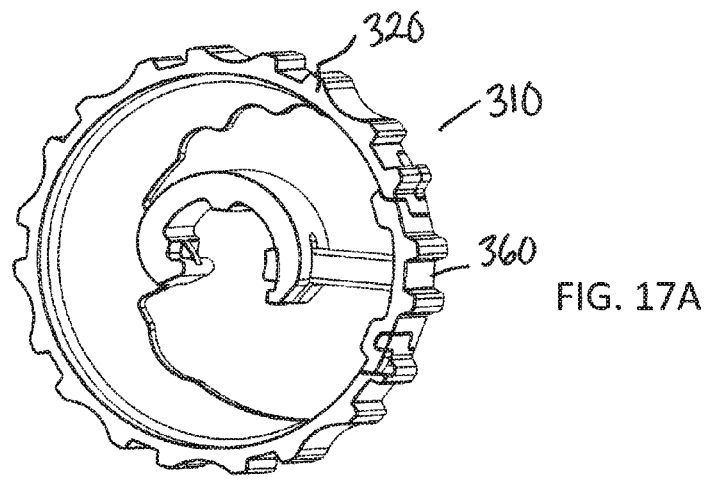
FIGS. 17A-17C show an assembled sprocket comprising the base portion of FIGS. 15A-15E and the cap portion of FIGS. 16A-16D.
Figure 17B:
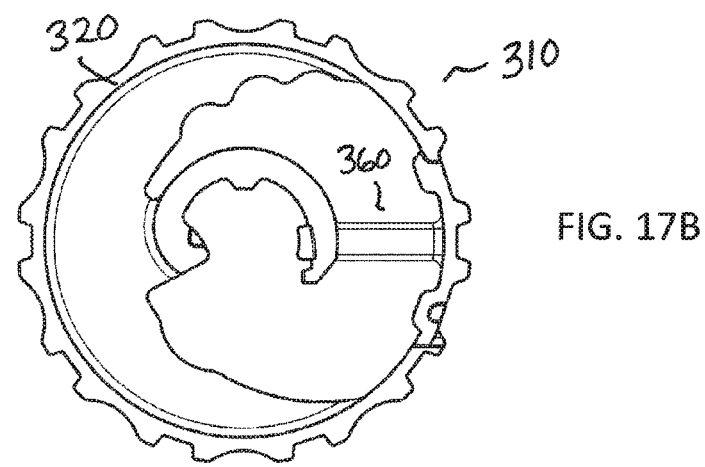
Figure 17C:
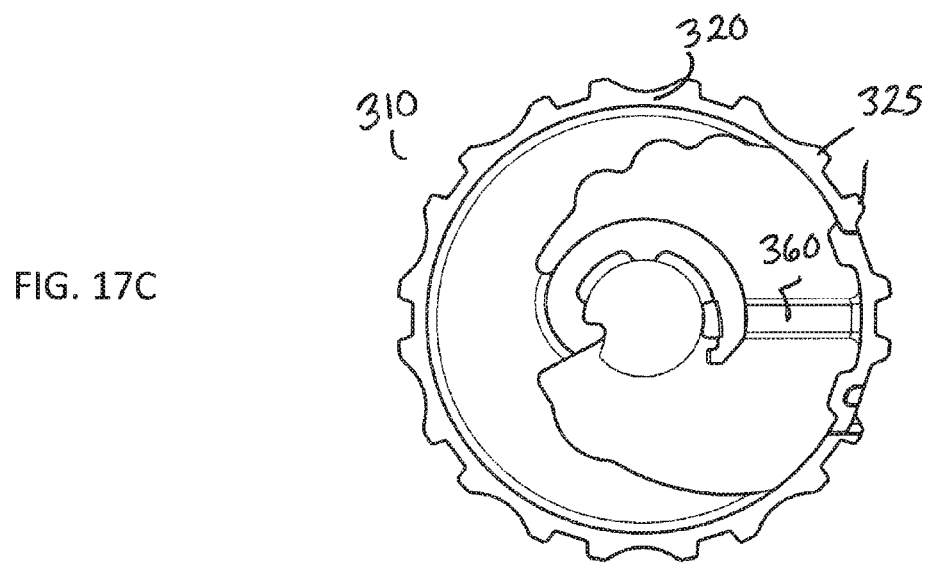

In another embodiment, the split sprocket may be designed to accommodate a conveyor belt with hinge laces. FIGS. 15A-15E show an embodiment of a base portion 320 of a split sprocket designed to engage a belt with hinge lace. FIGS. 16A-16D show an embodiment of a cap portion 360 designed to mate with the base portion 320 to form a complete sprocket designed to engage a belt with hinge lace. FIGS. 17A-17C show the complete sprocket 310 formed by mating the base portion 320 with the cap portion 360. FIG. 17C shows the complete sprocket 310 mounted on a shaft 12. In this embodiment, the drive teeth 325 are shaped differently to accommodate the drive structure of the corresponding conveyor belt.

Figure 18:
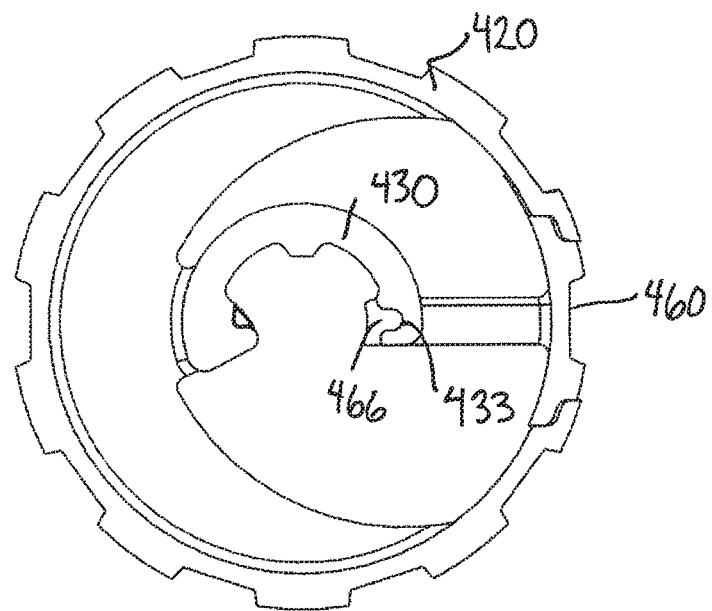
FIG. 18 shows an assembled split sprocket according to another embodiment of the invention.
Figure 19:
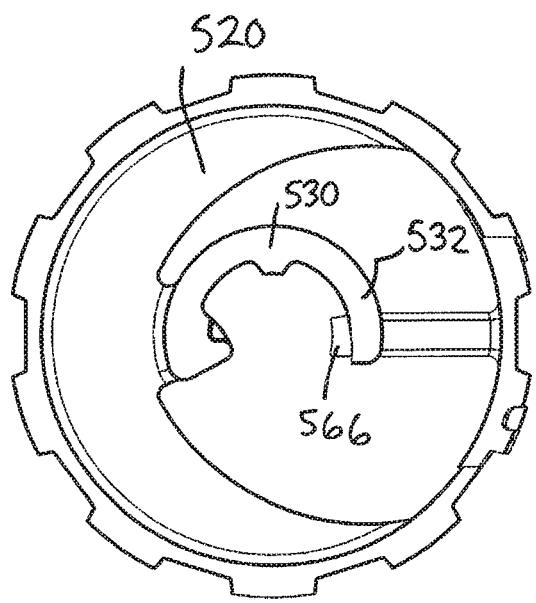
FIG. 19 shows an assembled split sprocket according to another embodiment of the invention.

In addition, the invention is not limited to the illustrative embodiments for mating the cap head to the hub of the base portion. For example, as shown in FIG. 18, a cap portion 460 may include a key design in the head 466 to prevent up and down movement of the cap head relative to the hub 430. The cap head has a puzzle piece-like projection that engages a corresponding recess 433 in the hub 430 of the base portion 420 to lock the cap head in place. In another embodiment, shown in FIG. 19, the second leg 532 of the snap clamp 530 may have no containment to allow free movement of the cap head 566 at the hub portion 530 of the base portion 520.

Figure 20:
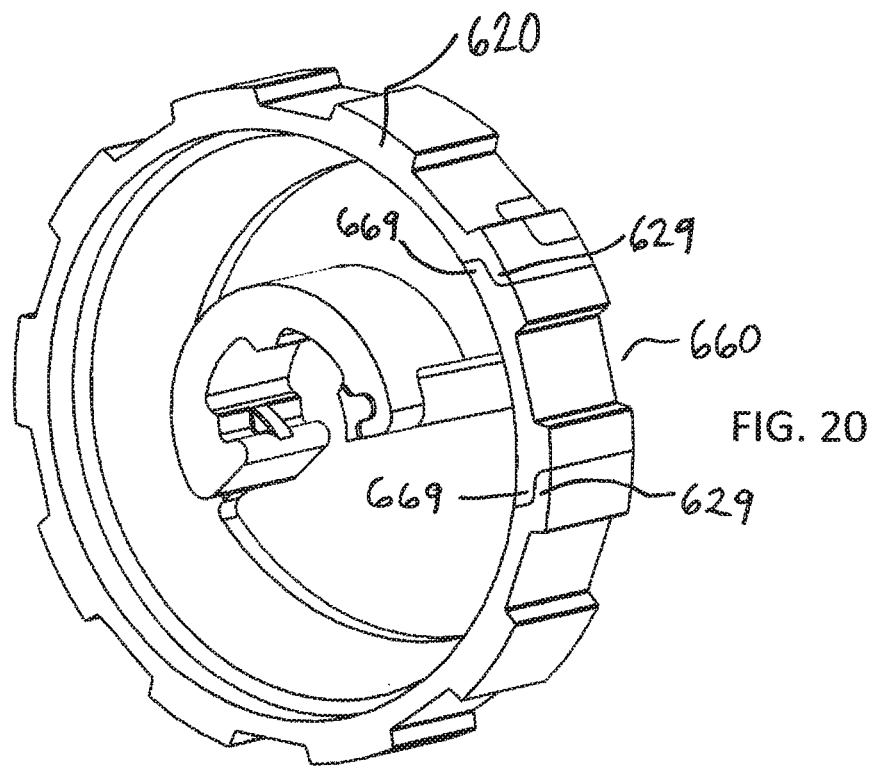
FIG. 20 shows an assembled split sprocket according to another embodiment of the invention.
Figure 21:
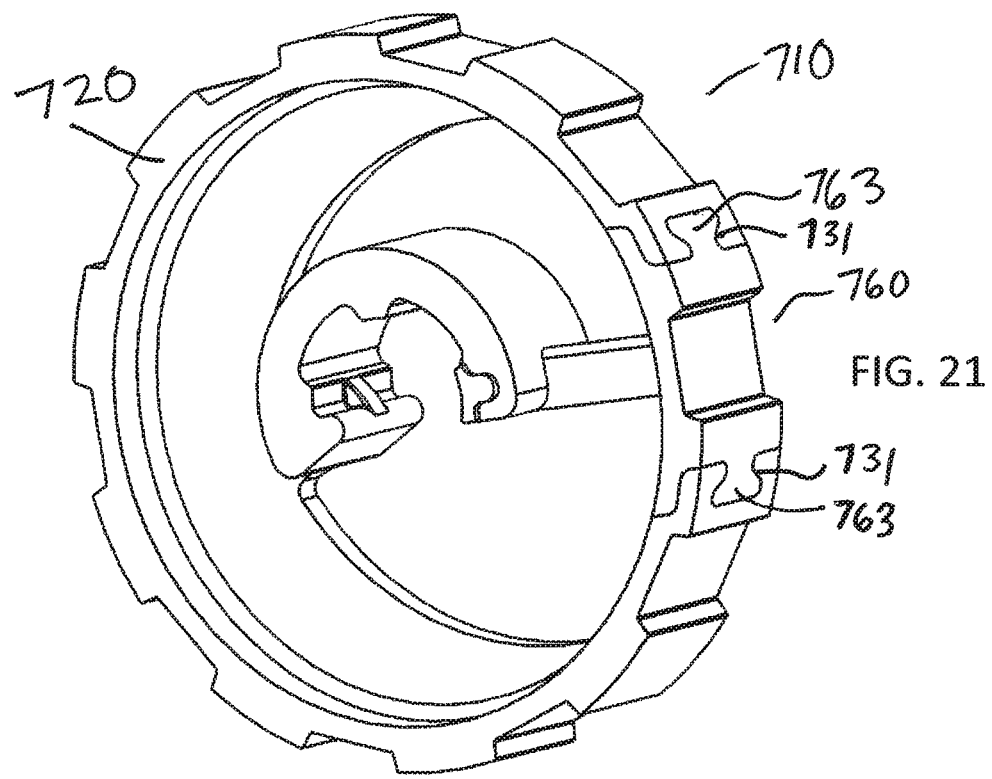
FIG. 21 shows an assembled split sprocket according to another embodiment of the invention.

FIGS. 20 and 21 show two alternative mating patterns between a base portion of a split sprocket and a cap portion of a split sprocket. As shown in FIG. 20, a base portion 620 may have overhangs 629 that overlap overhangs 669 on a cap portion 660 to ensure proper mating of the cap portion 660 and base portion 620 to form a complete sprocket 610 and prevent radially outward movement of the cap portion 660. In another embodiment, shown in FIG. 21, a cap portion 760 includes puzzle piece-like tabs 763 that engage complementary recesses 731 in a base portion 720, as well as overlapping overhangs to ensure proper mating of the cap portion 760 and base portion 720 to form a complete sprocket 710.

Although the invention has been described in reference to a version of a split sprocket, other versions are possible. For example, the periphery does not have to be toothed; it could be smooth like a roller, or grooved like a pulley. So, the term sprocket as used in the claims is meant to encompass split wheels with or without teeth on their peripheries.

What is claimed is:

1. A sprocket for a conveyor belt comprising:
    a first sprocket section having
        a curved peripheral portion defining driving elements; and
        a snap clamp radially inward of the peripheral portion for snapping the first sprocket section onto a shaft, the snap clamp comprising a central hub defining a central opening, a first leg having a slot extending therethrough and a second leg.
2. The sprocket of claim 1, wherein the second leg has a barbed tip for mating with a channel on the shaft.

3. The sprocket of claim 2, wherein the second leg further includes a tab extending between the inner surface of the central hub and the barbed tip for mating with an axial notch in the shaft.

4. The sprocket of claim 1, wherein the peripheral portion terminates in a first end and a second end, forming a space therebetween.

5. The sprocket of claim 4, further comprising a second sprocket section inserted in the space and coupled to the first end and second end to form a complete circumference.

6. The sprocket of claim 5, wherein the second sprocket section is rotationally symmetric.

7. The sprocket of claim 5, wherein the second sprocket section includes a curved peripheral portion and a stem extending inwards from the peripheral portion and terminating in a head.

8. The sprocket of claim 1, further comprising a web connecting the peripheral portion and the snap clamp.

9. A split sprocket comprising:
   a first sprocket section having a curved peripheral portion defining drive elements and forming a peripheral opening between a first end and a second end, the first sprocket section having a base protrusion at the first end and a base opening;
   a hub defining a central opening for receiving a shaft; and
   a cap having a peripheral portion inserted in the peripheral opening of the first sprocket section, a stem extending inwards from the peripheral portion and a head at the end of the stem extending within the hub for retaining the shaft within the hub, wherein the cap has a first channel for receiving the base protrusion on the first sprocket section and a cap protrusion configured to mate with the base opening in the first sprocket section.

10. The split sprocket of claim 9, wherein the hub comprises a collar having a first leg and a second leg terminating in a barbed tip.

11. The split sprocket of claim 10, wherein second leg further comprises an axial tab extending between an inner surface of the first leg and the barb of the tip.

12. The split sprocket of claim 9, wherein the cap is axially symmetric about a longitudinal axis of the stem.

13. The split sprocket of claim 9, wherein the peripheral portion of the cap spans one belt pitch.

14. A split sprocket comprising:
   a first sprocket section having a curved peripheral portion defining drive elements and forming a peripheral opening between a first end and a second end;
   a hub having a first leg and a second leg defining a central opening for receiving a shaft, the first leg having a slot; and
   a cap having an axially symmetric peripheral portion inserted in the peripheral opening of the first sprocket section to form a complete sprocket, the cap including a stem that is inserted in the slot.

15. The split sprocket of claim 14, wherein the second leg has a barbed tip for engaging a channel on the shaft.

16. A sprocket comprising:
   a first sprocket section having a curved peripheral portion defining drive elements and forming a peripheral opening between a first end and a second end;
   a hub defining a central opening for receiving a shaft and a slot extending perpendicular to the longitudinal axis of the central opening, wherein the central opening is offset from the peripheral opening; and
   a cap portion inserted in the peripheral opening of the curved sprocket section to form a complete sprocket.

17. The sprocket of claim 16, wherein the cap portion includes a stem extending radially inwards from a peripheral portion and terminating in a head, wherein the stem slides through the slot to place the head within the central opening.

* * * * *